June 10, 1958

R. SEIFERT ET AL 2,838,038

WELDED CYLINDER AND CRANKSHAFT CASING FOR
MULTICYLINDER PISTON ENGINES

Filed Jan. 28, 1957

INVENTORS,
RICHARD SEIFERT.
OTTO BAUR.

BY

ATTORNEY

United States Patent Office 2,838,038
Patented June 10, 1958

2,838,038

WELDED CYLINDER AND CRANKSHAFT CASING FOR MULTICYLINDER PISTON ENGINES

Richard Seifert and Otto Baur, Friedrichshafen, Germany, assignors to Maybach-Motorenbau G. m. b. H., Friedrichshafen, Germany, a firm of Germany Application January 28, 1957, Serial No. 636,620

Claims priority, application Germany January 30, 1956

4 Claims. (Cl. 123—195)

The present invention relates to a welded cylinder and crankshaft casing including cast and sheet metal parts for a multicylinder piston engine, particularly of an internal combustion engine of the tunnel type, the casing being subdivided transversely to the longitudinal axis of the engine into like outside groups and like inner groups.

Each inner group of the casing according to the invention comprises one half of a cylinder cooling jacket and one half of the neighboring cylinder cooling jacket and a bearing support placed in a plane which is between the two jacket halves and at a right angle to the longitudinal axis of the engine. Each outside group comprises one half of a cylinder cooling jacket and a support for an end bearing. The cooling jacket halves of adjacent groups are welded together. The bearing supports are interconnected by sheet metal parts which are welded to the bearing supports for forming a casing.

Conventional welded cylinder and crankshaft casings are welded at the adjacent parts of adjacent cylinders, which are not longitudinally split, so that the weld seams are in recesses which are difficult of access. Welding, therefore, requires special skill and much time. In casings according to the invention the seams are accessible and make possible clean and reliable weld seams.

Each inner and each outer group according to the invention comprises a first casting forming the cylinder casing and including halves of adjacent cylinder cooling jackets, in the case of the inner groups, and one half of the cylinder cooling jacket of an outside cylinder, in the case of an outer group, and an appendage, and a second casting forming a support for a crankshaft bearing, the second casting being connected with the appendage of the first casting by a weld which absorbs the dynamic stresses, the groups being directly connected by welding along axial cylinder cooling jacket seams and, if desired, by means of additional cover plates. The bearing supports formed by the groups are interconnected by sheet metal parts forming a casing.

It has been proposed to form each group of two or more parts which are welded together and to relieve the weld seams of dynamic stresses by means of additional parts, as tension strips or tension rods. Compared with structures of this kind, the structure according to the invention has the advantage of avoiding additional stress transmitting parts which increase weight and cost and of necessitating less manufacturing operations, such as deep bores for receiving tension rods and the like.

V-type and similar piston engines can also be built according to the present invention. In V-type engines the casting forming the cylinder casing is preferably split along the longitudinal center plane of the engine. This reduces the cost of manufacturing the casting.

Each inner and each outside group may be made as one casting so that welding is required only along lines extending axially of the cylinder cooling jackets and no weld is needed absorbing dynamic stresses.

The novel features which are considered characteristic of the invention are set forth with particularity in the appended claims. The invention itself, however, and additional objects and advantages thereof will best be understood from the following description of embodiments thereof when read in connection with the accompanying drawing in which:

Figures 1, 2, 7:
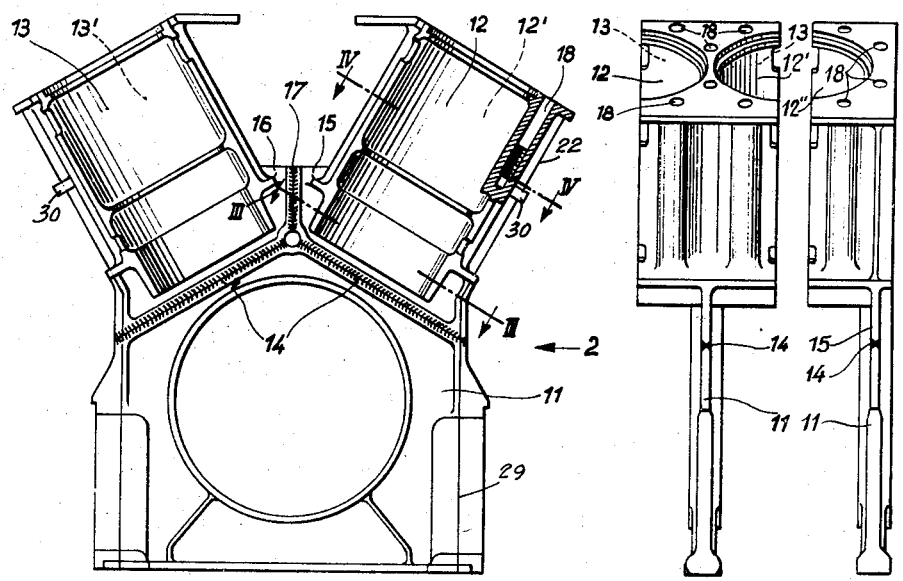
Fig. 1 is an end view of an inner group of castings according to the invention, a part being broken off to show a section along line I—I in Fig. 4.
Fig. 2 is a side view of the group shown in Fig. 1.
Fig. 7 is a side view of an outside group fitting the inner group illustrated in Figs. 1 and 2.

Figs. 1 to 4 and 7 of the drawing illustrate the application of the invention to a V-type multicylinder piston engine. Each inner group of the cylinder and crankshaft casing of this engine includes a bearing support 11, a casting 12, 12' forming one half of each of two adjacent cylinder cooling jackets on one leg of the V, and a casting 13, 13' forming one half of each of two adjacent cylinder cooling jackets on the other leg of the V. The part 11 is connected with the parts 12, 12' and 13, 13' by welds 14 located in planes which are transverse to the longitudinal axes of the cylinders so that the welds absorb the dynamic stresses between the cylinder heads and the crankshaft bearings.

The casting 12, 12' is provided with a transversal rib 15 and the casting 13, 13' is provided with a transversal rib 16. The ribs 15 and 16 have adjacent marginal portions located in the longitudinal center plane of the engine and connected by welding.

The upper portions of the castings 12, 12' and 13, 13' are provided with bores 18 for receiving the cylinder head bolts. These bores do not extend down to and beyond the welds 14 so that only the latter transmit dynamic stresses.

Figures 3, 4, 5, 6:
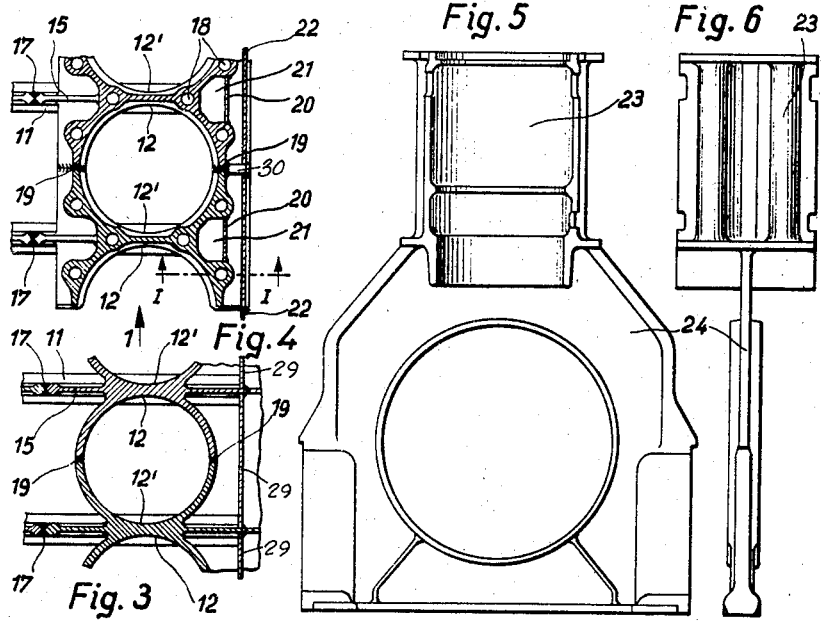
Figs. 3 and 4 are sectional views of adjacent groups of castings as shown in Fig. 1, welded together, the sections being made along lines III—III and IV—IV, respectively, in Fig. 1.
Fig. 5 is an end view of a modified inner casting according to the invention.
Fig. 6 is a side view of the casting shown in Fig. 5.

As seen in Figs. 3 and 4, the parts 12, 12' and 13, 13' of adjacent groups are connected by welds 19 extending axially of the cooling jackets. Adjacent halves of the cylinder cooling jackets are arranged like the halves of a bearing and form the inner wall of a cylindrical cooling jacket. Plate elements 20 may be welded to the outside of the parts 12, 12' and 13, 13' for forming cooling channels 21. Additional sheet metal elements 22 may be welded to suitable protuberances 30 welded to the parts 12, 12' and 13, 13' for conducting a coolant.

The bearing support parts 11 may be connected by means of sheet metal elements 29 which form a casing for the crankshaft.

Figs. 5 and 6 illustrate an embodiment of the invention suitable for engines in which all cylinders are in one line. The inner units, one of which is illustrated, and the outside units, not illustrated, individually consist of a single casting. A bearing support 24 is integral with an upper part 23 which, in the case of an inner unit, forms the halves of two adjacent cylinder cooling jackets. If desired, the bearing support 24 may be separated from the upper part 23 on a horizontal plane and welded to the upper part in this plane so that the welds absorb the dynamic stresses as in the embodiment shown in Figs. 1 to 4 and 7.

The bearing supports 11 (Figs. 1 to 4 and 7) and 24 (Figs. 5 and 6) surround the crankshaft, forming the so-called "tunnel engine" and making a special bedplate unnecessary.

Since the weld connection of the outside groups or units with the inner groups or units is exactly the same as the weld connection between two inner groups which connection is shown in Figs. 3 and 4, the connection of an outside group with an inner group is not specially illustrated.

What is claimed is:

1. A cylinder and crankshaft casing for a multicylinder piston engine which casing is split in planes transverse to the longitudinal axis of the engine and comprises two outside groups of castings and at least one inner group of castings placed between said outside groups, said inner group including a first casting forming one half of each of two adjacent cylinder cooling jackets and a second casting forming a bearing support extending in a plane which is transverse to the longitudinal axis of the engine and between said cylinder cooling jacket halves, said first and second castings having adjacent portions extending in a plane which is substantially transverse to the longitudinal cylinder axes, said portions being connected by welding, each of said outside groups including a first casting forming one half of a cylinder cooling jacket and a second casting forming a support for an end bearing, said first and second castings of each outside group having adjacent portions interconnected by welding and extending in a plane which is substantially transverse to the longitudinal cylinder axes, the first castings of adjacent groups being directly connected by welding along lines extending axially of the cylinder cooling jackets and in diametrical planes which are at a right angle to the longitudinal axis of the engine, and sheet metal elements welded to and interconnecting said second castings of adjacent groups.

2. A cylinder and crankshaft casing for a multicylinder piston engine which casing is split in planes transverse of the longitudinal axis of the engine and comprises two outside parts and at least one inner part placed between said outside parts, said inner part including one half of each of two adjacent cylinder cooling jackets and a bearing support extending around the crankshaft in a plane which is transverse to the rotation axis of the crankshaft and between said cylinder cooling jacket halves, each of said outside parts including one half of a cylinder cooling jacket and a support for an end bearing, said parts being connected in diametrical planes of the cylinder cooling jackets which planes are at a right angle to the longitudinal axis of the engine, and sheet metal elements connected with and interconnecting said bearing supports of adjacent parts.

3. A cylinder and crankshaft casing for a multicylinder V-type piston engine comprising two outside parts and at least one inner part placed between said outside parts, said inner part including a first portion forming one half of each of two adjacent cylinder cooling jackets on one leg of the V, a second portion forming one half of each of two adjacent cylinder cooling jackets on the other leg of the V, and a bearing support portion extending around the crankshaft in a plane extending between said cooling jacket halves and transversely to the longitudinal axis of the engine; each of said outside parts including a first portion forming one half of a cylinder cooling jacket on one leg of the V, a second portion forming one half of a cylinder cooling jacket on the other leg of the V, and a bearing support portion extending around the crankshaft in a plane extending transversely to the longitudinal axis of the engine, the adjacent parts being interconnected along diametrically opposed directrices of the respective cylinder cooling jackets.

4. A cylinder and crankshaft casing for a multicylinder V-type piston engine comprising two outside groups of castings and at least one inner group of castings placed between said outside groups, said inner group including a first casting forming one half of each of two adjacent cylinder cooling jackets on one leg of the V, a second casting forming one half of each of two adjacent cylinder cooling jackets on the other leg of the V, and a bearing support element extending from said castings in a plane which is transverse to the longitudinal axis of the engine and between said cylinder cooling jacket halves, said bearing support element being connected with said first and second castings in planes which are individually substantially transverse to the longitudinal axis of the respective cylinder cooling jacket, said first and second castings having adjacent portions situated adjacent to the longitudinal center plane of the engine and being interconnected; each of said outside groups including a first casting forming one half of a cylinder cooling jacket on one leg of the V, and including a second casting forming one half of a cylinder cooling jacket on the other leg of the V, said first and second castings of said outside groups having adjacent portions situated on the longitudinal center plane of the engine and being interconnected, each outside group including a support element for an end bearing extending in a plane which is transverse to the longitudinal axis of the engine, said last mentioned support element being connected with said castings of the respective outside group in planes which are individually substantially transverse to the longitudinal axes of the respective cylinder cooling jacket; the first and second castings of one group being connected with the first and second castings of an adjacent group along lines extending axially of the cylinder cooling jackets, and sheet metal elements connected to and interconnecting said bearing support elements of adjacent groups.

References Cited in the file of this patent

UNITED STATES PATENTS

| 2,740,393 | Hoffman | Apr. 3, 1956 |

FOREIGN PATENTS

| 238,755 | Great Britain | Aug. 27, 1925 |
| 645,894 | Great Britain | Nov. 8, 1950 |
| 167,892 | Switzerland | June 1, 1934 |
| 961,447 | France | Nov. 21, 1949 |